United States Patent
Sheikh et al.

(10) Patent No.: US 9,254,911 B2
(45) Date of Patent: Feb. 9, 2016

(54) FAULT TOLERANT LATERAL WAYPOINT SEQUENCING SYSTEM AND METHOD

(71) Applicant: HONEYWELL INTERNATIONAL INC., Morristown, NJ (US)

(72) Inventors: Shiraz Sheikh, Surprise, AZ (US); James Kenneth Haberstock, Phoenix, AZ (US); Daniel E. Lewis, Glendale, AZ (US); Baptiste Duffourd, Beaupuy (FR); Erwan Paricaud, Toulouse (FR)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 141 days.

(21) Appl. No.: 13/912,551

(22) Filed: Jun. 7, 2013

(65) Prior Publication Data

US 2014/0365037 A1    Dec. 11, 2014

(51) Int. Cl.

| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B64C 19/00* | (2006.01) |
| *G06F 11/07* | (2006.01) |
| *G05D 1/02* | (2006.01) |

(Continued)

(52) U.S. Cl.
CPC .............. *B64C 19/00* (2013.01); *G05D 1/0077* (2013.01); *G05D 1/0202* (2013.01); *G06F 11/0739* (2013.01); *G08G 5/0034* (2013.01); *G01C 23/00* (2013.01); *G06F 11/16* (2013.01); *G08G 5/0039* (2013.01)

(58) Field of Classification Search
CPC ...... G06F 11/0739; G06F 11/16; G01C 23/00
USPC .............. 701/3, 4, 466; 370/400, 401; 714/11
See application file for complete search history.

(56) References Cited

U.S. PATENT DOCUMENTS

| | | |
|---|---|---|
| 5,491,787 A | 2/1996 | Hashemi |
| 5,790,791 A | 8/1998 | Chong et al. |
| 6,377,892 B1 | 4/2002 | Johnson et al. |

(Continued)

OTHER PUBLICATIONS

MD-11 Flight Crew Operations Manual—The Boeing Company, Aug. 15, 2006.

(Continued)

*Primary Examiner* — Tuan C. To
*Assistant Examiner* — Isaac Smith
(74) *Attorney, Agent, or Firm* — Ingrassia Fisher & Lorenz, P.C.

(57) ABSTRACT

Fault-tolerant lateral waypoint sequencing is provided for a system that includes at least a first flight management computer and a second flight management computer. A processing operation associated with lateral leg sequencing of an aircraft flight plan is implemented in the flight management computers. A determination is made in the first flight management computer as to whether the first flight management computer has received, within a predetermined period of time from when the first flight management computer implemented the processing operation, a notification from the second flight management computer that the second flight has also implemented the processing operation. An action is initiated in the first flight management computer when the first flight management computer has not received the notification from the second flight management computer within the predetermined period of time.

22 Claims, 16 Drawing Sheets

(51) Int. Cl.
*G08G 5/00* (2006.01)
*G06F 11/16* (2006.01)

(56) References Cited

U.S. PATENT DOCUMENTS

| | | | |
|---|---|---|---|
| 7,020,076 B1* | 3/2006 | Alkalai et al. | 370/217 |
| 7,877,627 B1* | 1/2011 | Freydel | 714/11 |
| 2003/0222887 A1* | 12/2003 | Wilkins et al. | 345/618 |
| 2004/0064519 A1 | 4/2004 | Kato et al. | |
| 2012/0173052 A1* | 7/2012 | Nicolas et al. | 701/3 |

OTHER PUBLICATIONS

Gaisler, G.: "Concurrent error-detection and modular fault-tolerance in an 32-bit processing core for embedded space flight applications" URL: http://www.pldworld.com/_hdl/1/estec.esa.nl/ftp/pub/ws/wsd/erc32/doc/ftcs24.pdf.

EP Search Report for Application No. EP 14169089.1 Dated Nov. 28, 2014.

* cited by examiner

FAULT TOLERANT LATERAL WAYPOINT SEQUENCING SYSTEM AND METHOD

TECHNICAL FIELD

The present invention generally relates to lateral waypoint sequencing in a flight management system, and more particularly relates to fault tolerant lateral waypoint sequencing systems and method.

BACKGROUND

Most commercial aircraft are equipped with a Flight Management System (FMS). In most instances, the FMS is implemented with one or more Flight Management Computers (FMCs) or Flight Management Computers Functions (FMFs). These redundant FMSs proceed during normal coupled flight by sequencing through a flight plan that comprises a series of lateral legs that interconnect a plurality of waypoints. In the FMS, as each leg of a flight plan is "sequenced," the FMS issues guidance commands to the auto-flight system, which controls the aircraft to fly to a new leg and its associated trajectory. The control and signal of a leg sequence between multiple computers during real-time operation is an important system behavior that relies heavily on an additional level of integrity for higher precision aircraft path control during required navigation performance (RNP) operations.

Commercial aviation regulatory agencies have developed required navigation performance (RNP) protocols to facilitate the management of air traffic. Required navigation performance equipped aircraft can safely operate along various routes with less separation than previously needed. This can be significant, because less separation means that the number of aircraft that can safely use a particular airspace may increase, and therefore accommodate the increasing demand for air traffic capacity. Under these protocols, RNP values may be assigned to various segments, or legs, of an aircraft's flight plan. The RNP value defines an airspace within which the aircraft should remain for a predetermined percentage (e.g., 95 percent) of the total flying time, and may be referred to as the RNP corridor. Presently, it is very difficult to provide FMS guidance for procedures with RNP restrictions of ≤0.3 NM, without first requiring a flight crew to undergo significant training to perform the guidance monitoring for each procedure below RNP 0.3.

A traditional redundant FMS has a single queue of events which is stored and managed by one of the FMCs. A leg sequencing event is actually generated by a master FMC (coupled to the auto-pilot) and is imposed on other FMCs. The actual detection of condition to sequence and process the next leg of a flight plan is ultimately acted upon based on only one real-time solution. Thus, while highly unlikely, it is postulated that an error in the master FMC could (and likely would) be propagated to the FMCs. Such a postulated event is incompatible with RNP operations. Independent detection and control of leg sequencing operations would provide the additional level of integrity that can be used to more closely control the flight of an aircraft and provide compatibility with RNP operations.

Hence, there is a need for a flight management system that enables guidance for procedures with RNP restrictions of ≤0.3 NM, thereby alleviating the need for flight crews to undergo significant training. There is also a need for a flight management system that implements a system and method for independently detecting and controlling leg sequencing operations among a plurality of FMCs, to thereby provide fault tolerant lateral waypoint sequencing, and compatibility with RNP operations. The present invention addresses at least this need.

BRIEF SUMMARY

In one embodiment, a method of providing fault-tolerant lateral waypoint sequencing in a system comprising at least a first flight management computer and a second flight management computer includes implementing, in the first flight management computer, a processing operation associated with lateral leg sequencing of an aircraft flight plan. A determination is made, in the first flight management computer, if the first flight management computer has received, within a predetermined period of time from when the first flight management computer implemented the processing operation, a notification from the second flight management computer that the second flight has also implemented the processing operation. An action is initiated, in the first flight management computer, when the first flight management computer has not received the notification from the second flight management computer within the predetermined period of time.

In another embodiment, a flight management system that provides fault-tolerant lateral waypoint sequencing includes a first flight management computer and a second flight management computer. The first flight management computer is configured to implement a processing operation associated with lateral leg sequencing of an aircraft flight plan. The second flight management computer is in communication with the first flight management computer. The second flight management computer is configured to implement the processing operation and, upon implementing the processing operation, to transmit a notification to the first flight management computer. The first flight management computer is further configured to initiate an action when the first flight management computer has not received the notification from the second flight management computer within a predetermined period of time.

Furthermore, other desirable features and characteristics of the fault-tolerant lateral waypoint sequencing system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
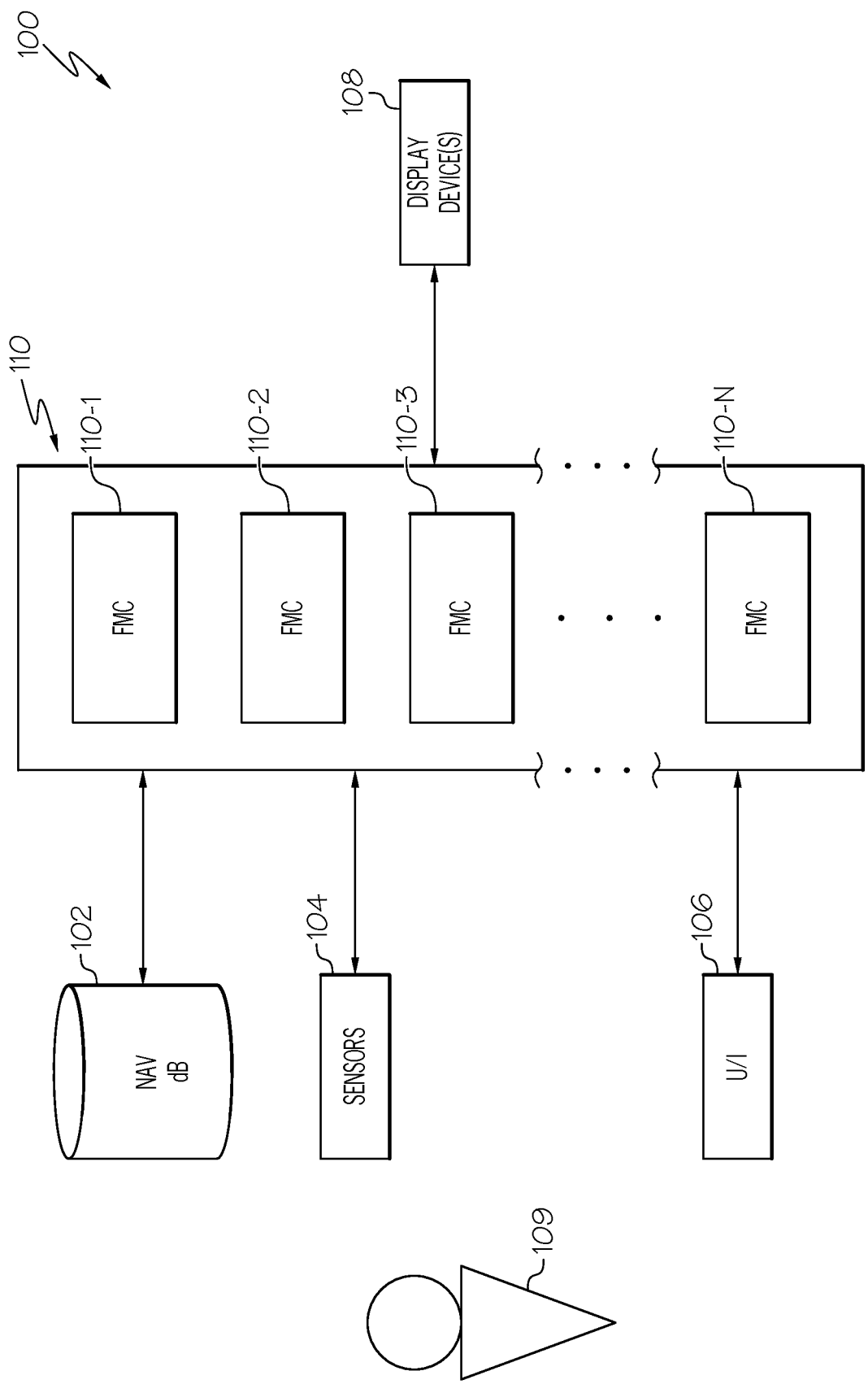
FIG. 1 depicts a functional block diagram of a portion of an embodiment of a flight management system.

Referring to FIG. 1, a functional block diagram of a portion of one exemplary embodiment of a flight management system (FMS) 100 is depicted, and includes one or more navigation databases 102, sensors 104, a user interface 106, one or more display devices 108, and a plurality of flight management computers (FMCs) 110 (e.g. 110-1, 110-2, 110-3, . . . 110-N). The navigation databases 102 (only one shown) each include various types of navigation-related data. These navigation-related data include various flight plan related data such as, for example, waypoints, leg defining distances, headings between waypoints, data related to different airports, navigational aids, obstructions, special use airspace, political boundaries, communication frequencies, and aircraft approach information, just to name a few. It will be appreciated that, although the navigation database 102 is, for clarity and convenience, shown as being stored separate from the FMCs 110, all or portions of the navigation database 102 could be integrated into one or more of the FMCs 110.

The sensors 104, which, for ease of illustration, are depicted as a single functional block, are configured to supply various types of inertial data to the FMCs 110. The inertial data that the sensors 104 supply may vary, and may include, for example, data representative of the state of the aircraft such as, for example, aircraft position, speed, altitude, and heading, just to name a few. The sensors 104 may also be variously configured and implemented, and may include, for example, global positioning system (GPS) sensors, inertial sensors, radio and/or radar based sensors, speed sensors, and air data or pressure sensors, just to name a few.

The user interface 106 is configured to receive input from a user 109 (e.g., a pilot) and, in response to the user input, supply command signals to one or more of the FMCs 110. The user interface 106 may be any one, or combination, of various known user interface devices including, but not limited to, a cursor control device (CCD), such as a mouse, a trackball, or joystick, and/or a keyboard, one or more buttons, switches, or knobs. The user interface may also include a display device. For example, the user interface 106 may, in some embodiments, be implemented as a control display unit (CDU), which includes both a keyboard and a display device. It should be noted that the user interface 106 is typically configured to interface with all of the FMCs 110 in synchronous operation. However, it may also be configured to interface with a specific FMC 110 in asynchronous (independent) operation. In synchronous operation, a flight plan modification requested through the user interface 106 is propagated to all the FMCs 110. In asynchronous operation, however, a flight plan modification will only be sent to a single FMC 110. Thus, if common flight plans are desired during asynchronous operation, a flight plan modification will have to be performed for each FMC 110 via the user interface 106.

The one or more display devices 108 (only one shown) selectively render various textual, graphic, and/or iconic information, and thereby supply visual feedback to a user 109 (e.g., a pilot). It will be appreciated that the one or more display devices 108 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display devices 108 may additionally be implemented as a panel mounted display, a HUD (head-up display), or any one of numerous other known technologies. It is additionally noted that the display devices 108 may be configured as any one of numerous types of aircraft flight deck displays. For example, the one or more display devices 108 may be configured as multi-function displays (MFDs), primary flight displays (PFDs), or navigation displays (NDs), just to name a few.

The FMCs 110 may be any implemented using any one of numerous known general-purpose microprocessors or an application specific processor that operates in response to program instructions. It will additionally be appreciated that the FMCs 110 may be implemented using various other circuits, not just a programmable processor. For example, digital logic circuits and analog signal processing circuits, just to name a few, could also be used. No matter how each FMC 110 is specifically implemented, each is in communication with the one or more navigation databases 102, the sensors 104, the user interface 106, and the one or more display devices 108. The FMCs 110 are configured, in response to the inertial data, to supply commands to a non-illustrated aircraft auto-pilot and/or flight director to automatically fly and/or direct, respectively, a flight plan that was, for example, entered via the user interface 106. The FMCs 110 are also configured to supply appropriate display commands to the one or display devices 108 that cause the appropriate display device 108 to render various types of textual, graphic, and/or iconic information.

To implement the above-described functionality, the FMCs 110 are each configured to, among other things, implement processing operations associated with lateral leg sequencing of an aircraft flight plan. That is, the sequencing of the aircraft from the current (or "active") lateral leg of the flight plan onto the next lateral leg of the flight plan. The specific processing operations that the FMCs 110 implement may vary. However, as will now be described, the processing operations provide fault tolerant lateral waypoint sequencing, and thus provide compatibility with RNP operations. Before describing the processing operations, however, it is noted that for convenience, clarity, and ease of description, the following description will assume that the FMS 100 includes only two FMCs 110 that interact to carry out the described processing operations. These two FMCs are referred to herein as a first FMC 110-1 and a second FMC 110-2. It is further noted that in some embodiments, the first FMC 110-1 may be configured as a "master" FMC 110, and the second FMC 110-2 may be configured as a "slave" FMC 110. In some instances, however, the reverse may be true. That is, the first FMC 110-1 may be configured as the "slave" FMC 110, and the second FMC 110-2 may be configured as the "master" FMC 110. More-over, for added clarity, it is additionally noted that the "master-slave" relationship is applicable only during synchronous operation of the FMCs 110.

Before proceeding further, it is additionally noted that one or more of the depicted FMCs 110 may also implement what is referred to herein as an "event manager." In synchronous operation, one FMC 110 (not necessarily the "master" FMC) is configured to implement the event manager. Flight plan changes requested through the user interface 106 are queued into the event manager along with internally generated events such as a leg sequence. Internally generated events are referred to herein as "pseudo-button pushes" (described further below) to indicate that these events are not a result of a user interface entry. This is done to ensure all FMCs 110 process events in the same order when in synchronous operation. In asynchronous (independent) operation, each FMC maintains its own event manager.

Figure 2:
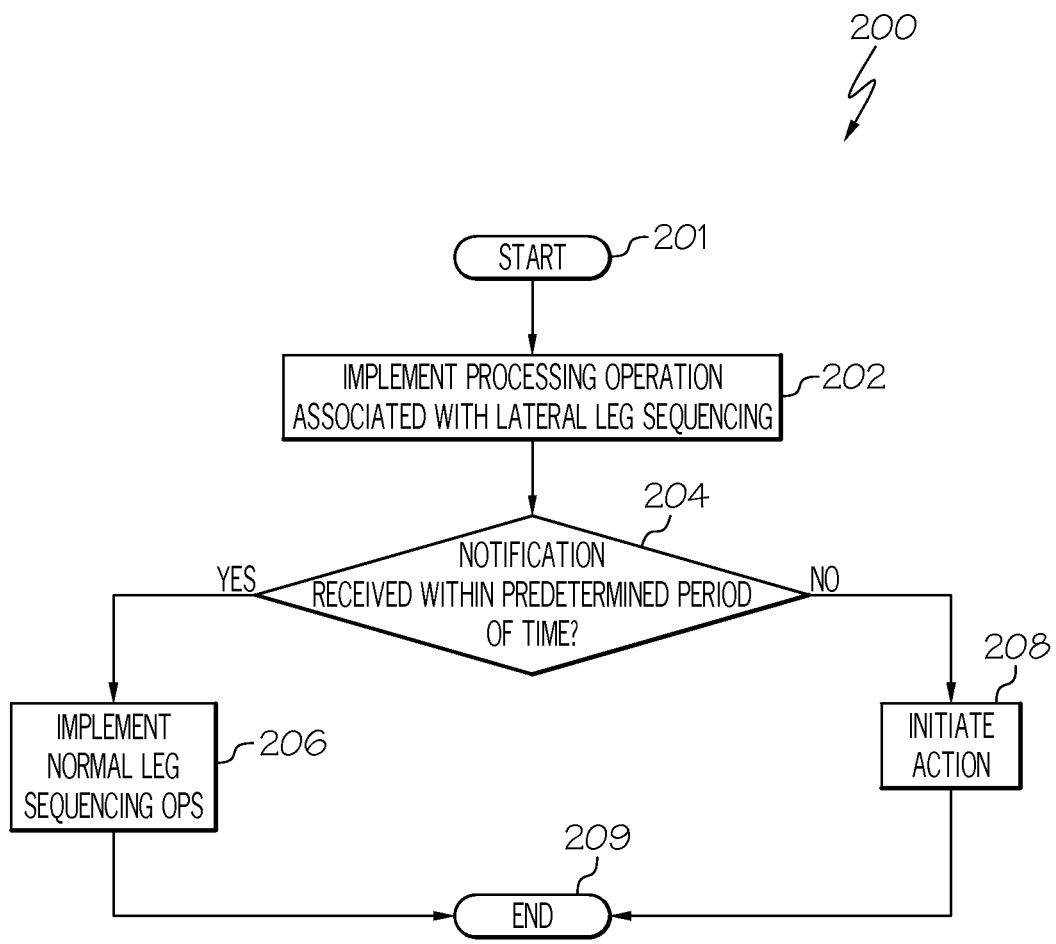
FIG. 2 depicts a process, in flowchart form, that may be implemented in the system of FIG. 1 to provide fault-tolerant lateral waypoint sequencing.

Referring now to FIG. 2, the general process that is implemented in the FMS 100 is depicted in flowchart form, and begins with the first FMC 110-1 implementing a processing operation associated with lateral leg sequencing of an aircraft flight plan (202). It should be noted that this particular processing operation may vary. For example, and as will be described in more detail further below, this processing operation may be only the determination that leg sequencing conditions have been met to process a lateral leg sequence for the same active leg, or it may additionally be the actual processing of the lateral leg sequence of the aircraft flight plan for the same active leg.

No matter the particular processing operation that is implemented, the first FMC 110-1 then determines if it has received, within a predetermined period of time from when it implemented the processing operation, a notification from the second FMC 110-2 that the second FMC 110-2 has also implemented the processing operation for the same active leg (204). If so, then normal lateral leg sequencing operations are implemented (206). If not, then the first FMC 110-1 initiates an action (208). The action that the first FMC 110-1 initiates may also vary. In some embodiments, the action may include generating an alert (audible, visual, or both), generating a signal that causes the first and second FMCs 110-1, 110-2 to operate in independent mode, or both. It will be appreciated that the predetermined period of time referred to herein may vary depending, for example, on the leg type. For example, a fixed period of time may be used for a CF or a TF leg, whereas the period of time may be a function of vertical speed for altitude terminating legs, such as an FA leg. In one particular embodiment, in which the predetermined period of time is fixed, a suitable time of 3.0 seconds may be used. Again, it should be appreciated that this is merely one exemplary time value, and that others may be selected, as needed or desired.

Figure 3A:
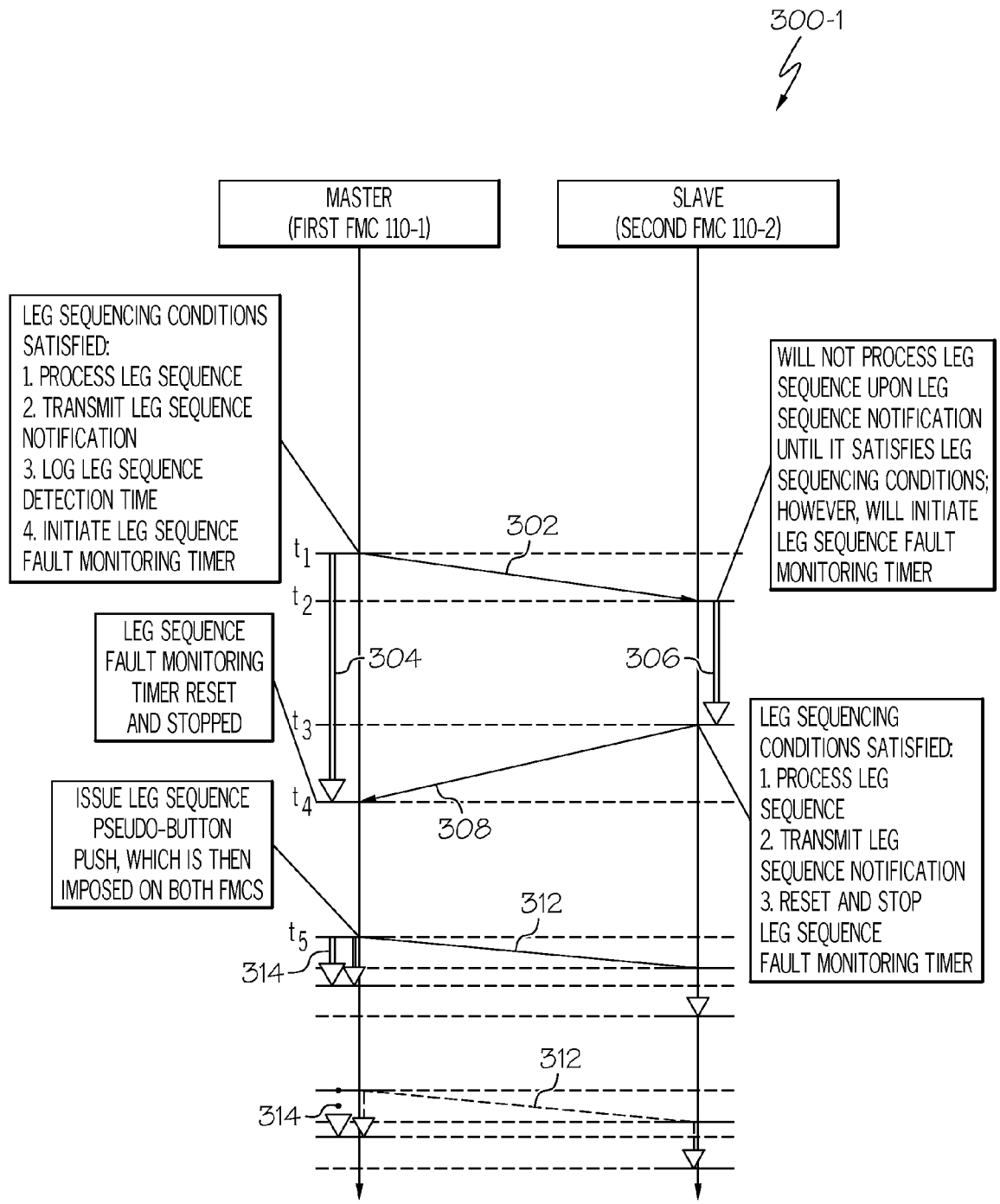
FIGS. 3A-3D depict processing diagrams for one particular embodiment of the process depicted in FIG. 2.

As was noted above, the particular processing operation that the FMCs 110 implement may vary. In one particular embodiment, the processing operation is the determination that leg sequencing conditions have been met to process a lateral leg sequence. To more clearly illustrate this embodiment, and the subsequent processing operations that take place with this embodiment, the processing diagrams depicted in FIGS. 3A-3D are provided and will now be described. Referring first to FIG. 3A, this processing diagram 300-1 depicts the processing operations that occur when the first (or "master") FMC 110-1 determines that that leg sequencing conditions have been met before the second (or "slave") FMC 110-2 has made this determination.

As illustrated, at (t1) the first FMC 110-1 determines that leg sequencing conditions have been met, but the second FMC 110-2 has not yet made this determination. In accordance with this embodiment, the first FMC 110-1, upon determining that leg sequencing conditions have been met, goes ahead and processes the leg sequence. The first FMC 110-1 also transmits a leg sequence notification 302 to the second FMC 110-2, logs the leg sequence determination time, and initiates a timer 304. It should be noted that the second FMC 110-2 will not process the leg sequence upon receipt of the leg sequence notification 302 unless or until it has also independently determined that leg sequencing conditions have been met. However, the second FMC 110-2 will, upon receipt of the leg sequence notification 302 at (t2), initiate its own timer 306.

In the depicted example it is seen that at (t3) the second FMC 110-2 determines that leg sequencing conditions have been met. Because the second FMC 110-2 has already received the leg sequence notification 302 from the first FMC 110-1, the second FMC 110-2 goes ahead and processes the leg sequence and transmits a leg sequence notification 308 to the first FMC 110-1. However, there is no need for the second FMC 110-2 to log the leg sequence determination time or to re-initiate its timer. Rather, the timer 306 in the second FMC 110-2 is reset and stopped.

At (t4), the first FMC 110-1 receives the leg sequence notification 308 from the second FMC 110-2. In the example depicted in FIG. 3A, the time period between (t1) and (t4) is within the predetermined period of time (204). Thus, the timer 304 in the first FMC 110-1 is reset and stopped, and normal (and conventional) leg sequence processing is implemented in the first and second FMCs 110-1, 110-2. Although this conventional leg sequence processing may vary, in the depicted embodiment this includes the first FMC 110-1 issuing, at (t5), what is referred to herein as a "leg sequence pseudo-button push" 312, which is imposed on both FMCs 110-1, 110-2. The first FMC 110-1, also at (t5), initiates a pseudo-button push timer 314. If, as illustrated using the dotted arrowhead lines, the pseudo-button push 312 is not processed within a predetermined time period (e.g., 5 seconds) from when the pseudo-button push timer 314 was initiated, then the first FMC 110-1 will re-issue the leg sequence pseudo-button push 312. As is generally known, the leg sequence pseudo-button push 312 causes the active leg reference that is used by the different processes and applications (display system output, user interface processing, performance predictions, etc.) within an FMC 110 to advance to the next leg. As already noted, this is a conventionally known process. As such, a detailed description of this process need not be, and thus will not be, provided.

Figure 3B:
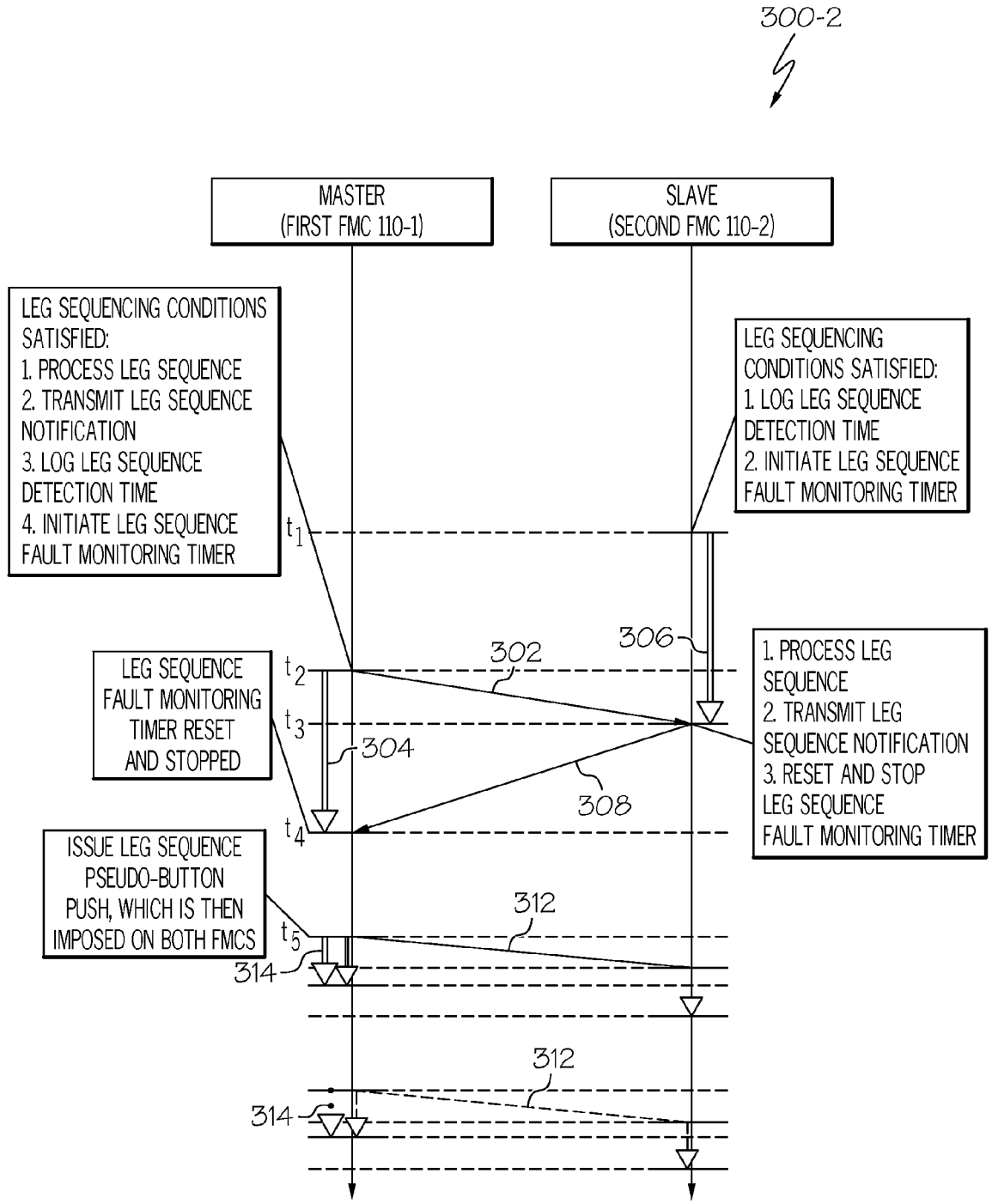

Referring now to FIG. 3B, this processing diagram 300-2 depicts the processing operations that occur when the second (or "slave") FMC 110-2 determines that that leg sequencing conditions have been met before the first (or "master") FMC 110-1 has made this determination. When this occurs, as shown at (t1), the second FMC 110-2, does not process the leg sequence nor does it transmit a leg sequence notification 308 to the first FMC 110-1. However, the second FMC 110-2 does log the leg sequence determination time and initiates its own timer 306.

Subsequently, at (t2), the first FMC 110-1 determines that leg sequencing conditions have been met. The first FMC 110-1, upon making this determination, processes the leg sequence, transmits the leg sequence notification 302 to the second FMC 110-2, logs the leg sequence determination time, and initiates its timer 304. The second FMC 110-2, at (t3), receives the leg sequence notification 302 from the first FMC 110-1. In the depicted example, the time period between (t1) and (t3) is within the predetermined period of time (204). As a result, the second FMC 110-2 processes the leg sequence, transmits a leg sequence notification 308 to the first FMC 110-1, and resets and stops its timer 306.

At (t4), the first FMC 110-1 receives the leg sequence notification 308 from the second FMC 110-2. In the depicted example, the time period between (t2) and (t4) is also within the predetermined period of time (204). Thus, the timer 304 in the first FMC 110-1 is reset and stopped and, at (t5), the normal (and conventional) leg sequence processing described above is implemented in the first and second FMCs 110-1, 110-2.

Figure 3C:
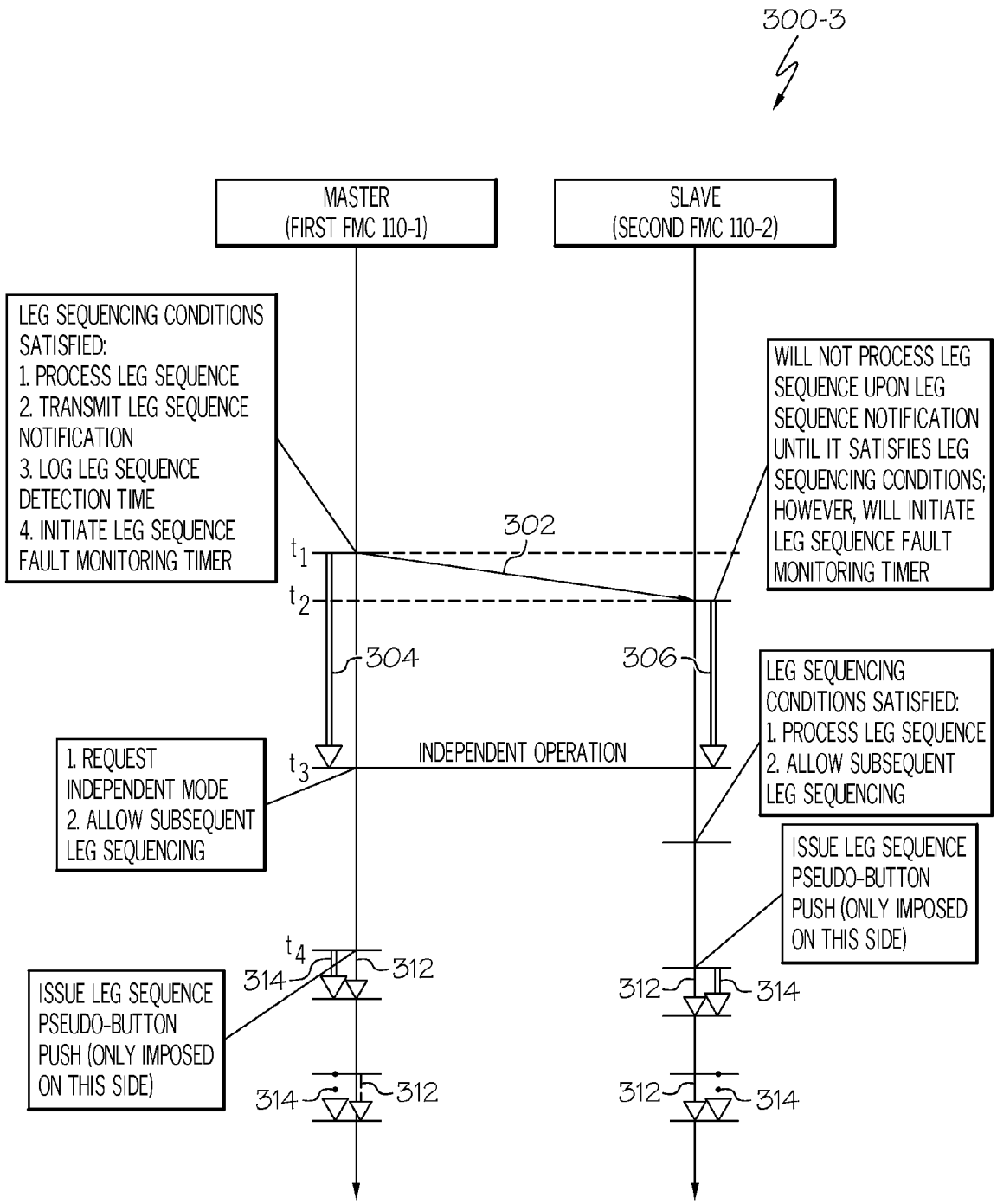

With reference now to FIG. 3C, this processing diagram 300-3 depicts the case where the first FMC 110-1 determines that that leg sequencing conditions have been met before the second FMC 110-2 has made this determination, but both FMCs 110-1, 110-2 do not detect leg sequencing conditions within the predetermined period of time (204) of each other. As with the case depicted in FIG. 3A, at (t1) the first FMC 110-1 determines that leg sequencing conditions have been met, but the second FMC 110-2 has not yet made this determination. Again, the first FMC 110-1, upon determining that leg sequencing conditions have been met, goes ahead and processes the leg sequence, transmits the leg sequence notification 302 to the second FMC 110-2, logs the leg sequence determination time, and initiates its timer 304. Also consistent with the case depicted in FIG. 3A, the second FMC 110-2, upon receipt of the leg sequence notification 302 at (t2), does not process the leg sequence, but does initiate its own timer 306.

Unlike the case depicted in FIG. 3A, in the case depicted in FIG. 3C the first FMC 110-1 does not receive a leg sequence notification 308 from the second FMC 110-2 within the predetermined period of time (204). As a result, at (t3) the first FMC 110-1 initiates the previously-described action (208). In the depicted embodiment, this action comprises issuing a request to operate the first and second FMCs 110-1, 110-2 in independent mode. When operating in independent mode, subsequent leg processing by the first FMC 110-1 continues without regard to the second FMC 110-2, and vice-versa. Thus, at (t4), when the second FMC 110-2 does determine that that leg sequencing conditions have been met, the second FMC 110-2 continues with subsequent leg processing.

At (t5) and (t6), respectively, the first FMC 110-1 and the second FMC 110-2 each issue a leg sequence pseudo-button push 312. These leg sequence pseudo-button pushes 312 are only imposed on the associated FMCs 110-1, 110-2. The first and second FMCs 110-1, 110-2 also each initiate a pseudo-button push timer 314. If, as illustrated using the dotted arrowhead lines, an associated pseudo-button push 312 is not processed within a predetermined time period (e.g., 5 seconds) from when the associated pseudo-button push timer 314 was initiated, then the first or second FMC 110-1, 110-2, as appropriate, will re-issue the leg sequence pseudo-button push 312.

Figure 3D:
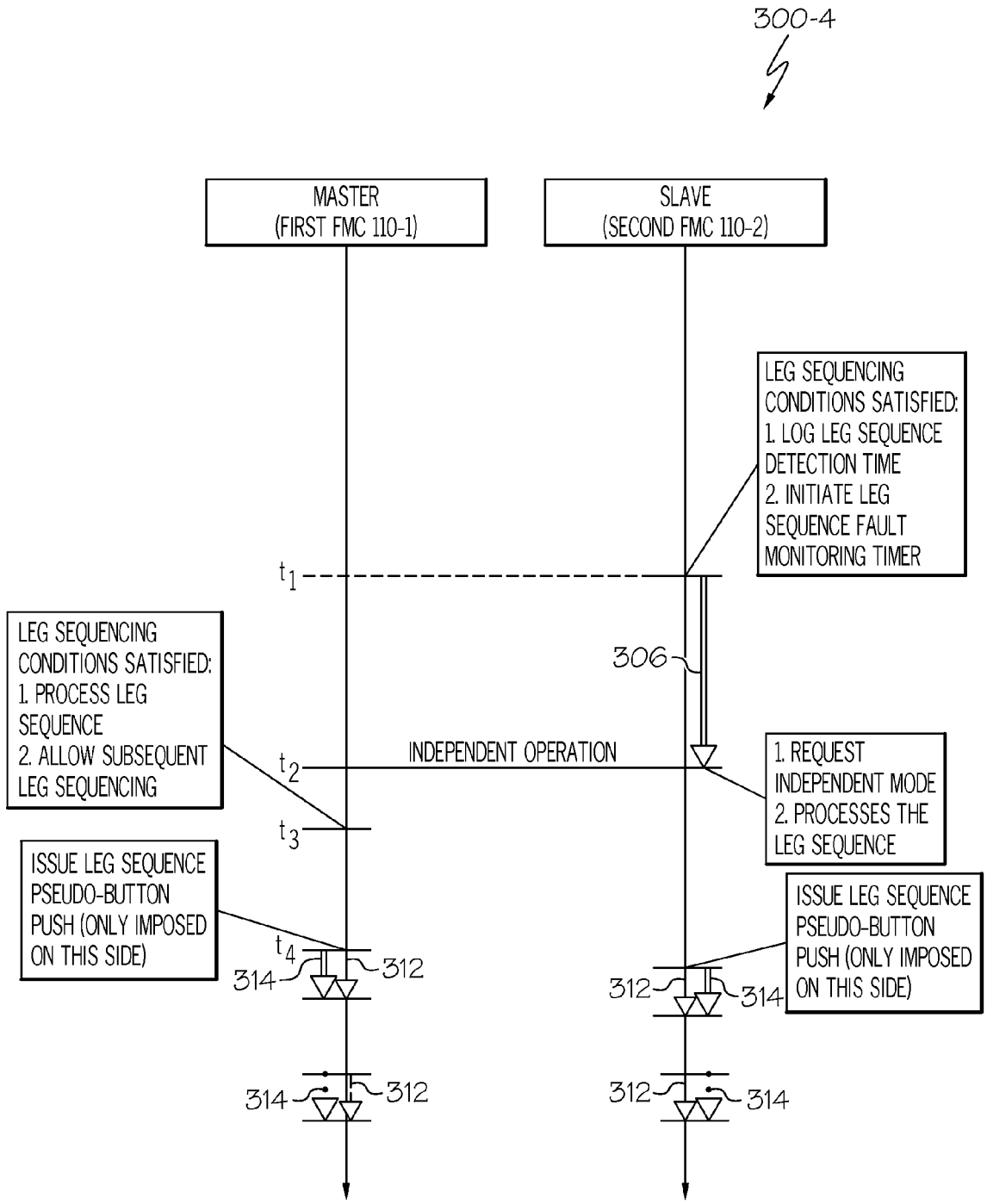

Referring finally to FIG. 3D, this processing diagram 300-4 depicts the case where the second FMC 110-2 determines that that leg sequencing conditions have been met before the first FMC 110-1 has made this determination, but both FMCs 110-1, 110-2 do not detect leg sequencing conditions within the predetermined period of time (204) of each other. As with the case depicted in FIG. 3B, the second FMC 110-2, at (t1), determines that leg sequencing conditions have been met, but the first FMC 110-1 has not yet made this determination. As a result, the second FMC 110-2 does not process the leg sequence nor does it transmit a leg sequence notification 308 to the first FMC 110-1. It does, however, log the leg sequence determination time and initiates its timer 306.

Unlike the case depicted in FIG. 3B, in the case depicted in FIG. 3D the second FMC 110-2 does not receive a leg sequence notification 302 from the first FMC 110-1 within the predetermined period of time (204). As a result, at (t2) the second FMC 110-2 initiates the previously-described action (208) which, consistent with the above, comprises issuing a request to operate the first and second FMCs 110-1, 110-2 in independent mode. Thus, when the second FMC 110-2 issues the request to operate in independent mode, it also processes the leg sequence and allows subsequent leg sequence processing on its side. Additionally, at (t3), when the first FMC 110-1 does determine that that leg sequencing conditions have been met, the first FMC 110-1 will process the leg sequence and continue with subsequent leg processing on its side.

Consistent with the processing diagram 300-3 depicted in FIG. 3C, at (t4) and (t5), respectively, the first FMC 110-1 and the second FMC 110-2 each issue a leg sequence pseudo-button push 312. These leg sequence pseudo-button pushes 312 are only imposed on the associated FMCs 110-1, 110-2. The first and second FMCs 110-1, 110-2 also each initiate a pseudo-button push timer 314. If, as illustrated using the dotted arrowhead lines, an associated pseudo-button push 312 is not processed within a predetermined time period (e.g., 5 seconds) from when the associated pseudo-button push timer 314 was initiated, then the first or second FMC 110-1, 110-2, as appropriate, will re-issue the leg sequence pseudo-button push 312.

In the embodiment depicted in FIGS. 3A-3D, each FMC 110 detects conditions to sequence a lateral leg, and transmits this status to the other FMC 110. The master FMC 110, which in the depicted embodiment is the first FMC 110-1, processes the lateral leg sequence for guidance upon detecting sequencing conditions, but the slave FMC 110, which in the depicted embodiment is the second FMC-110-2, does not process the lateral leg sequence for guidance upon detecting sequencing conditions until it receives, within the predetermined time period, the leg sequence notification for the same active leg from the first FMC 110-1. Additionally, the display active legs are synchronized to reflect the leg sequence on the first FMC 110-1 and the second FMC 110-2 only after both of the FMCs 110 have detected leg sequence conditions being satisfied, as a result of processing the leg sequence pseudo-button push.

Figure 4A:
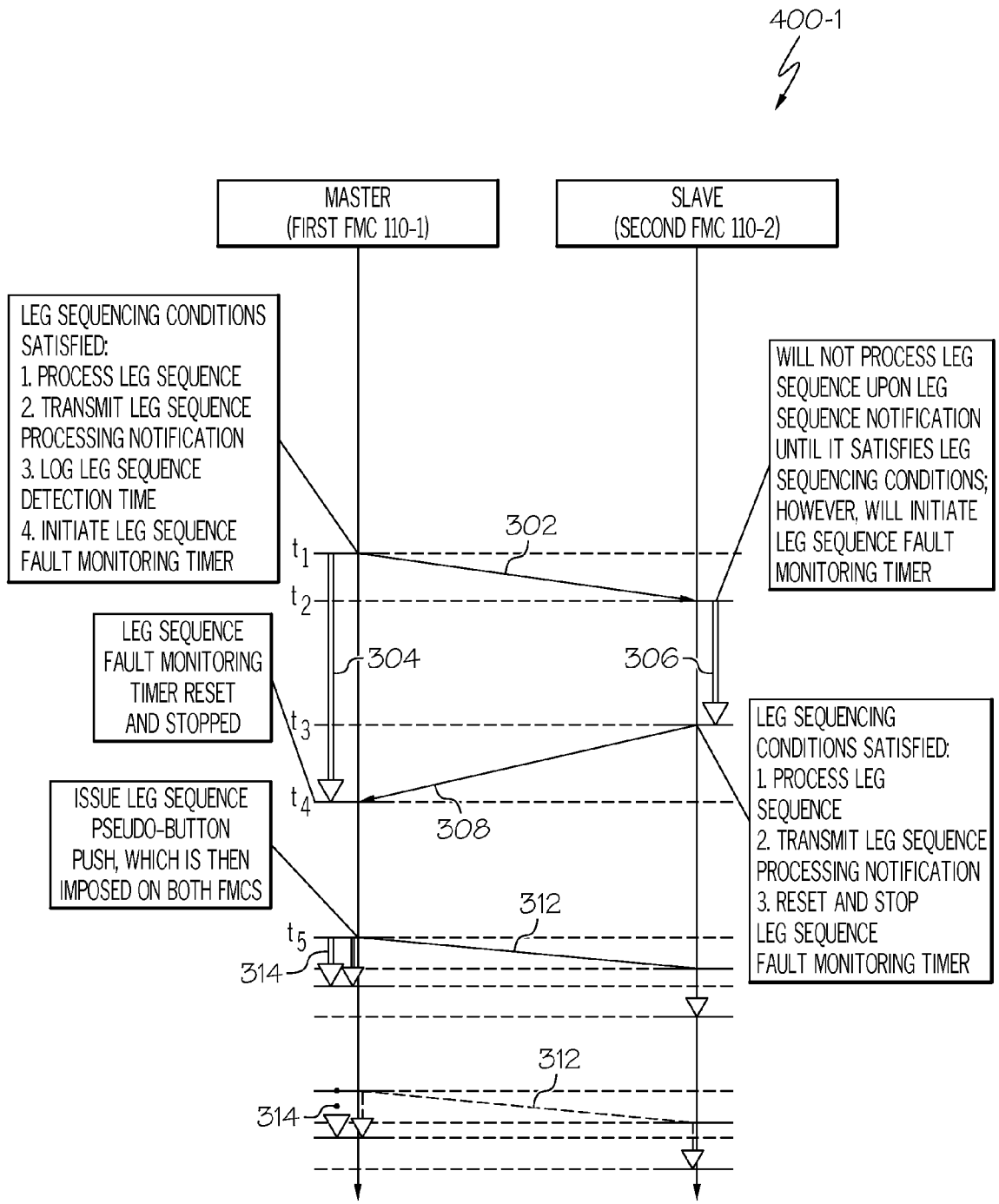
FIGS. 4A-4D depict processing diagrams for a second particular embodiment of the process depicted in FIG. 2.

In another embodiment, the processing operation (202) that the first and second FMCs 110-1, 110-2 implement comprises not just the determination that leg sequencing conditions have been met to process a lateral leg sequence but processing the lateral leg sequence of the aircraft flight plan. To more clearly illustrate this second embodiment, and the subsequent processing operations that take place with this embodiment, the processing diagrams depicted in FIGS. 4A-4D are provided and will now be described. Referring first to FIG. 4A, this processing diagram 400-1 depicts the processing operations that occur when the first (or "master") FMC 110-1 processes a leg sequence before the second (or "slave") FMC 110-2.

As illustrated, at (t1) the first FMC 110-1 has determined that leg sequencing conditions have been met, and immediately processes the leg sequence. At this point in time, however, the second FMC 110-2 has not determined that leg sequencing conditions have been met. In accordance with this embodiment, the first FMC 110-1, upon processing the leg sequence, also transmits a leg sequence processing notification 302 to the second FMC 110-2, logs the leg sequence processing time, and initiates a timer 304. As with the previous embodiment, the second FMC 110-2 will not process the leg sequence upon receipt of the leg sequence processing notification 302 unless or until it has also independently determined that leg sequencing conditions have been met. However, the second FMC 110-2 will, upon receipt of the leg sequence processing notification 302 at (t2), initiate its own timer 306.

Thereafter, at (t3), the second FMC 110-2 determines that leg sequencing conditions have been met, and processes the leg sequence. The second FMC 110-2 also transmits a leg sequence processing notification 308 to the first FMC 110-1. Because the second FMC 110-2 has already received the leg sequence processing notification 302 from the first FMC 110-1, there is no need to log the leg sequence processing time or to re-initiate its timer. Rather, the timer 306 in the second FMC 110-2 is reset and stopped.

At (t4), the first FMC 110-1 receives the leg sequence processing notification 308 from the second FMC 110-2. In the example depicted in FIG. 4A, the time period between (t1) and (t4) is within the predetermined period of time (204). Thus, the timer 304 in the first FMC 110-1 is reset and stopped, and normal (and conventional) leg sequence processing is implemented in the first and second FMCs 110-1, 110-2. The normal and conventional leg sequence processing has already been described, and will not therefore be repeated.

Figure 4B:
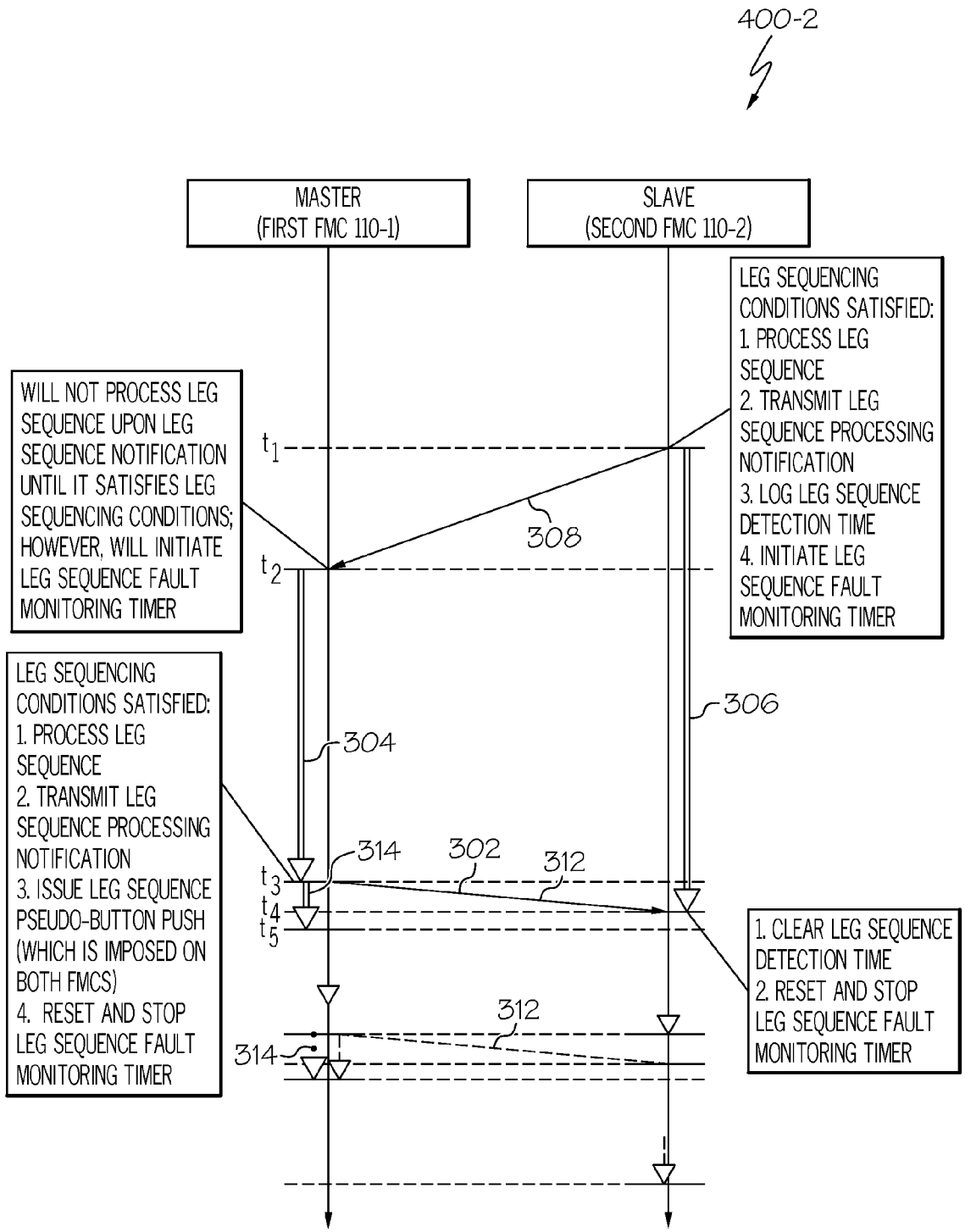

Referring now to FIG. 4B, this processing diagram 400-2 depicts the processing operations that occur when the second (or "slave") FMC 110-2 determines that leg sequencing conditions have been met and processes a leg sequence before the first (or "master") FMC 110-1. In accordance with this embodiment, the second FMC 110-2, upon determining that leg sequencing conditions have been met, immediately processes the leg sequence. The second FMC 110-2, upon processing the leg sequence, also transmits a leg sequence processing notification 308 to the first FMC 110-1, logs the leg sequence processing time, and initiates its timer 306. With this embodiment, the first FMC 110-1 will not process the leg sequence upon receipt of the leg sequence processing notification 308 until it has also independently determined that leg sequencing conditions have been met. However, the first FMC 110-1 will, upon receipt of the leg sequence processing notification 308 at (t2), initiate its own timer 304.

Subsequently, at (t3), the first FMC 110-1 determines that leg sequencing conditions have been met and, upon making this determination, processes the leg sequence and simultaneously transmits the leg sequence processing notification 302 and the pseudo-button push 312 to the second FMC 110-2. In addition, the timer 304 in the first FMC 110-1 is reset and stopped. The second FMC 110-2, at (t4), receives the leg sequence processing notification 302 and the pseudo-button push 312 from the first FMC 110-1. In the depicted example, the time period between (t1) and (t4) is within the predetermined period of time (204). As a result, the second FMC 110-2 clears the leg sequence processing time that it had logged, and resets and stops its timer 306. In addition, the normal (and conventional) leg sequence processing described above is implemented in the first and second FMCs 110-1, 110-2.

Figure 4C:
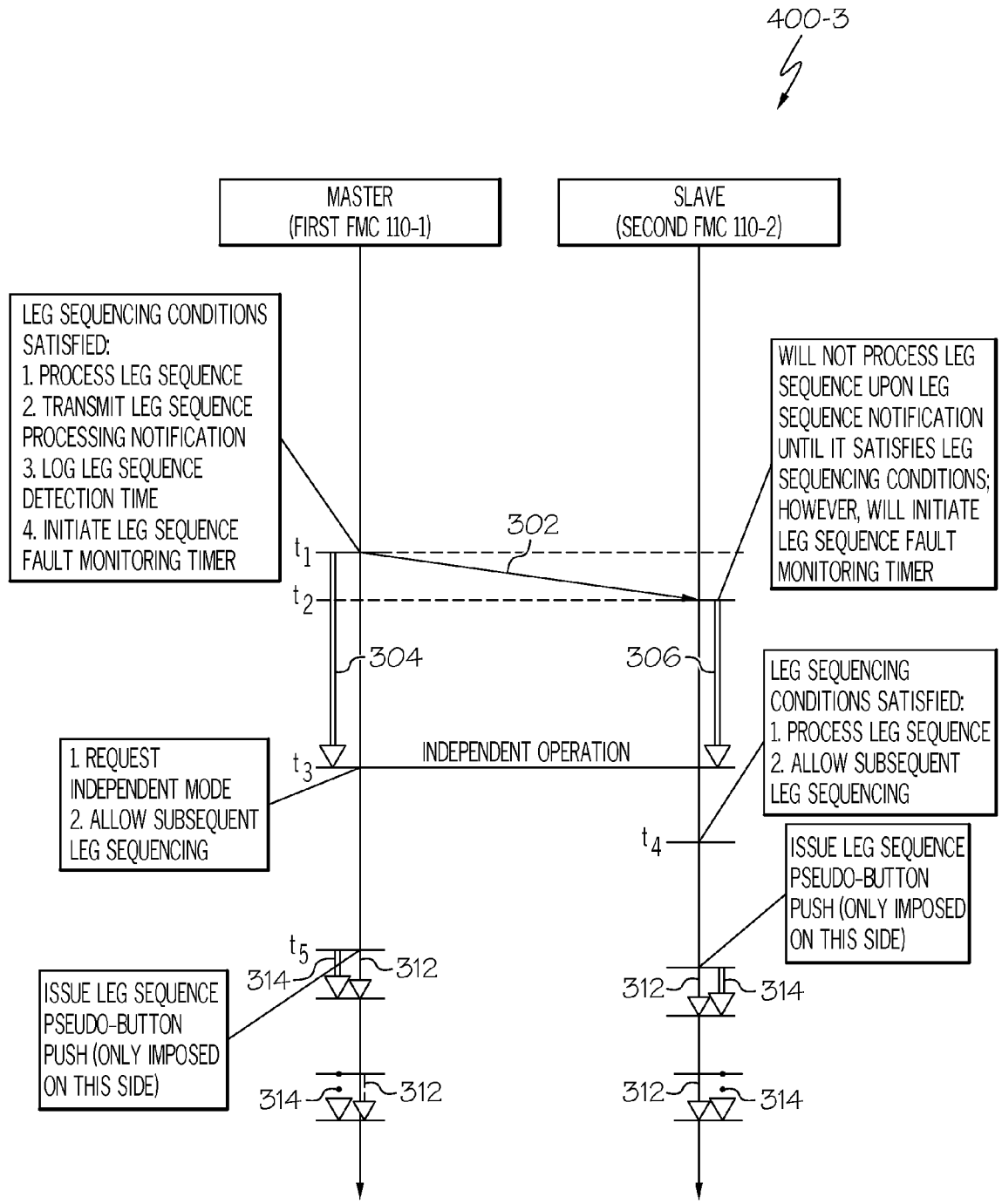

With reference now to FIG. 4C, this processing diagram 400-3 depicts the case where the first FMC 110-1 determines that leg sequencing conditions have been met and processes a leg sequence before the second FMC 110-2, but both FMCs 110-1, 110-2 do not determine that leg sequencing conditions have been met within the predetermined period of time (204) of each other. As with the case depicted in FIG. 4A, at (t1) the first FMC 110-1 has determined that leg sequencing conditions have been met, and immediately processes the leg sequence. The first FMC 110-1, upon processing the leg sequence, also transmits the leg sequence processing notification 302 to the second FMC 110-2, logs the leg sequence processing time, and initiates its timer 304. Again, the second FMC 110-2 will not process the leg sequence upon receipt of the leg sequence processing notification 302 but it will, at (t2), initiate its own timer 306.

Unlike the case depicted in FIG. 4A, in the case depicted in FIG. 4C the first FMC 110-1 does not receive the leg sequence processing notification 308 from the second FMC 110-2 within the predetermined period of time (204). As a result, at (t3) the timers 304, 306 in the first and second FMCs 110-1, 110-2, respectively, are reset and stopped, and the first FMC 110-1 initiates the previously-described action (208). In the depicted embodiment, this action comprises issuing a request to operate the first and second FMCs 110-1, 110-2 in independent mode. Thus, at (t4), when the second FMC 110-2 does determine that that leg sequencing conditions have been met, it immediately processes the leg sequence. Additionally, the normal (and conventional) leg sequence processing described above is implemented independently in the first and second FMCs 110-1, 110-2.

Figure 4D:
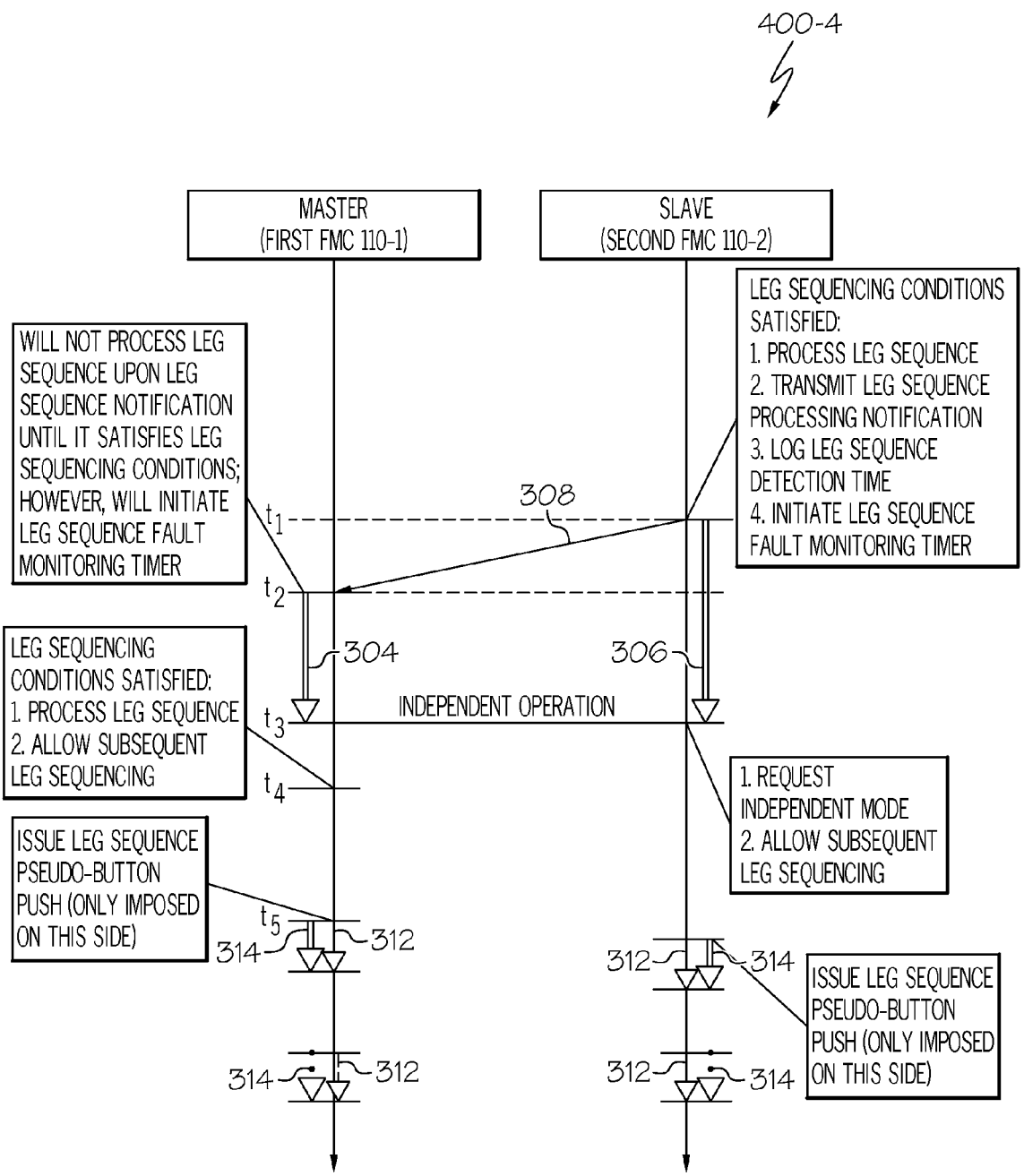

Now, with reference to FIG. 4D, this processing diagram 400-4 depicts the case where the second FMC 110-2 determines that leg sequencing conditions have been met and processes a leg sequence before the first FMC 110-1, but both FMCs 110-1, 110-2 do not determine that leg sequencing conditions have been met within the predetermined period of time (204) of each other. As with the case depicted in FIG. 4B, the second FMC 110-2, upon determining that leg sequencing conditions have been met, immediately processes the leg sequence. The second FMC 110-2, upon processing the leg sequence, also transmits a leg sequence processing notification 308 to the first FMC 110-1, logs the leg sequence processing time, and initiates its timer 306. Again, the first FMC 110-1 will not process the leg sequence upon receipt of the leg sequence processing notification 308 until it has also independently determined that leg sequencing conditions have been met. However, it will, upon receipt of the leg sequence processing notification 308 at (t2), initiate its own timer 304.

Unlike the case depicted in FIG. 4B, in the case depicted in FIG. 4D the second FMC 110-2 does not receive the leg sequence processing notification 302 from the first FMC 110-1 within the predetermined period of time (204). As a result, at (t3) the timers 304, 306 in the first and second FMCs 110-1, 110-2, respectively, are reset and stopped, and the second FMC 110-2 initiates the previously-described action (208) which, consistent with the above, comprises issuing a request to operate the first and second FMCs 110-1, 110-2 in independent mode. Thereafter, at (t4), when the first FMC 110-1 does process the leg sequence, the normal (and conventional) leg sequence processing described above is implemented independently in the first and second FMCs 110-1, 110-2.

In the embodiment depicted in FIGS. 4A-4D, the guidance active legs are synchronized by each FMC 110 upon detecting and processing leg sequencing conditions. The display active legs are only synchronized on both FMCs after at least two FMC's guidance functions have detected leg sequence conditions being satisfied, as a result of the processing of the leg sequence pseudo-button push.

The processing diagrams depicted in FIGS. 5A-5D are very similar to those depicted in FIGS. 3A-3D and 4A-4D, and thus will not be described with the same level of detail. The major difference (relative to the embodiments depicted in FIGS. 3A-3D and 4A-4D) with the embodiment depicted in FIGS. 5A-5D is that the guidance active leg is kept in synch with the rest of the system and only advances on the processing for the leg sequence pseudo-button push. With this configuration, each FMC 110 will detect conditions to sequence a lateral leg, as in the previously described embodiments, and transmit this status to the other FMC 110. Also similar to previously described embodiments, each FMC 110 will transmit a leg sequence processing notification. However, a leg sequence processing notification will not be issued until at least two FMCs 110 have indicated that each has satisfied the conditions for sequencing the same active lateral leg. When this leg sequence processing notification is received on all of the FMCs 110, the active lateral leg will then be advanced.

Figure 5A:
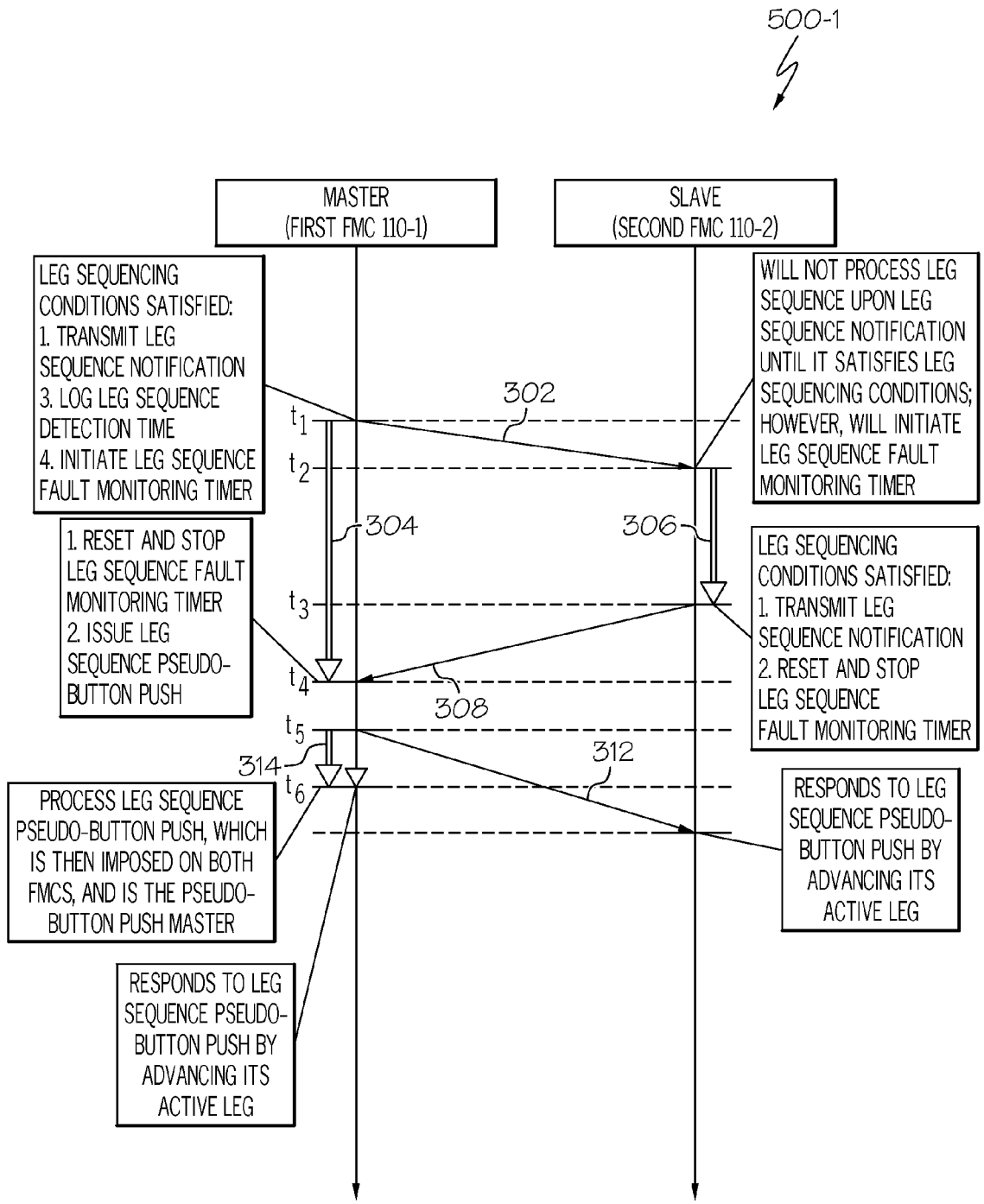
FIGS. 5A-5D depict processing diagrams for a third particular embodiment of the process depicted in FIG. 2.
Figure 5B:
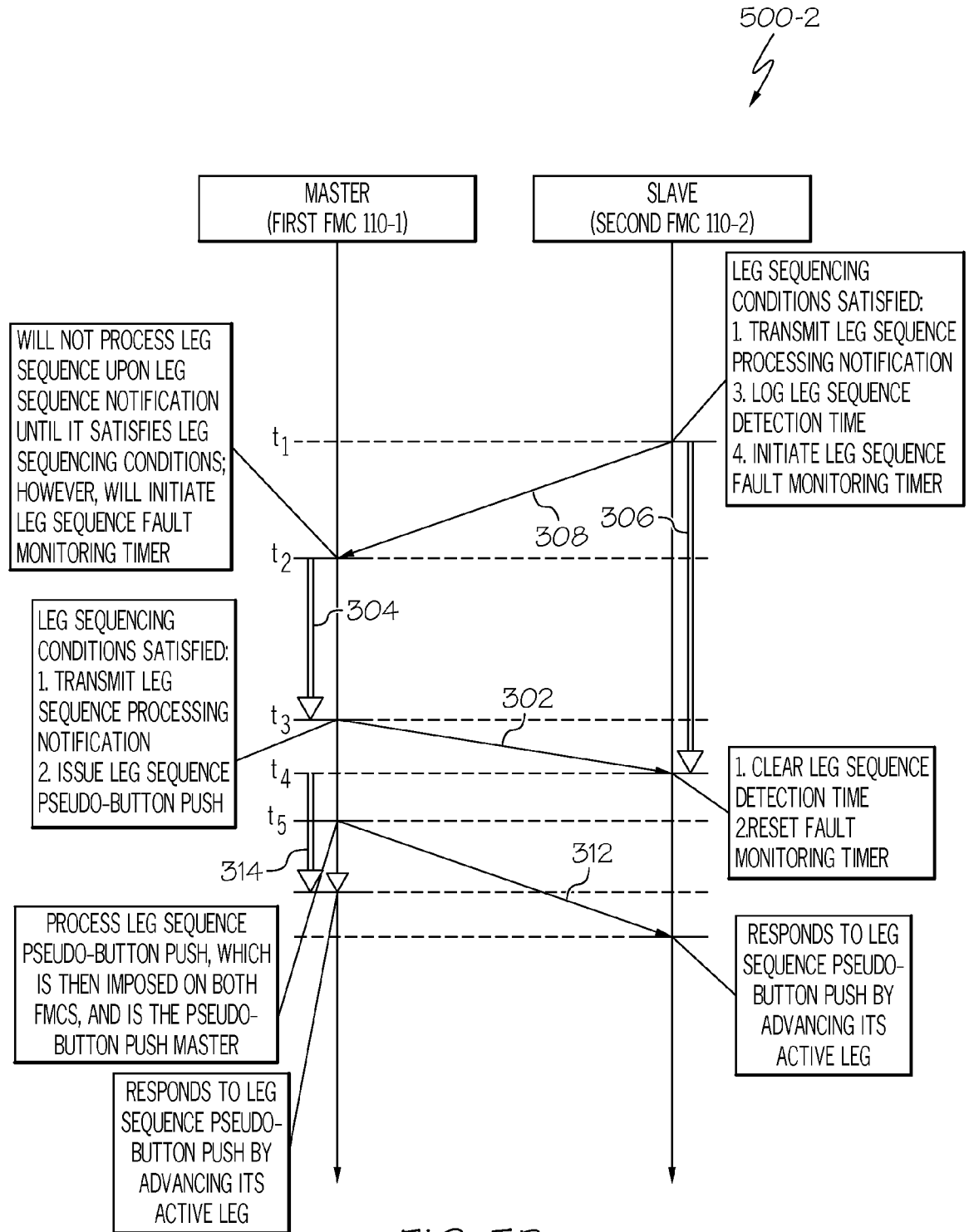
Figure 5C:
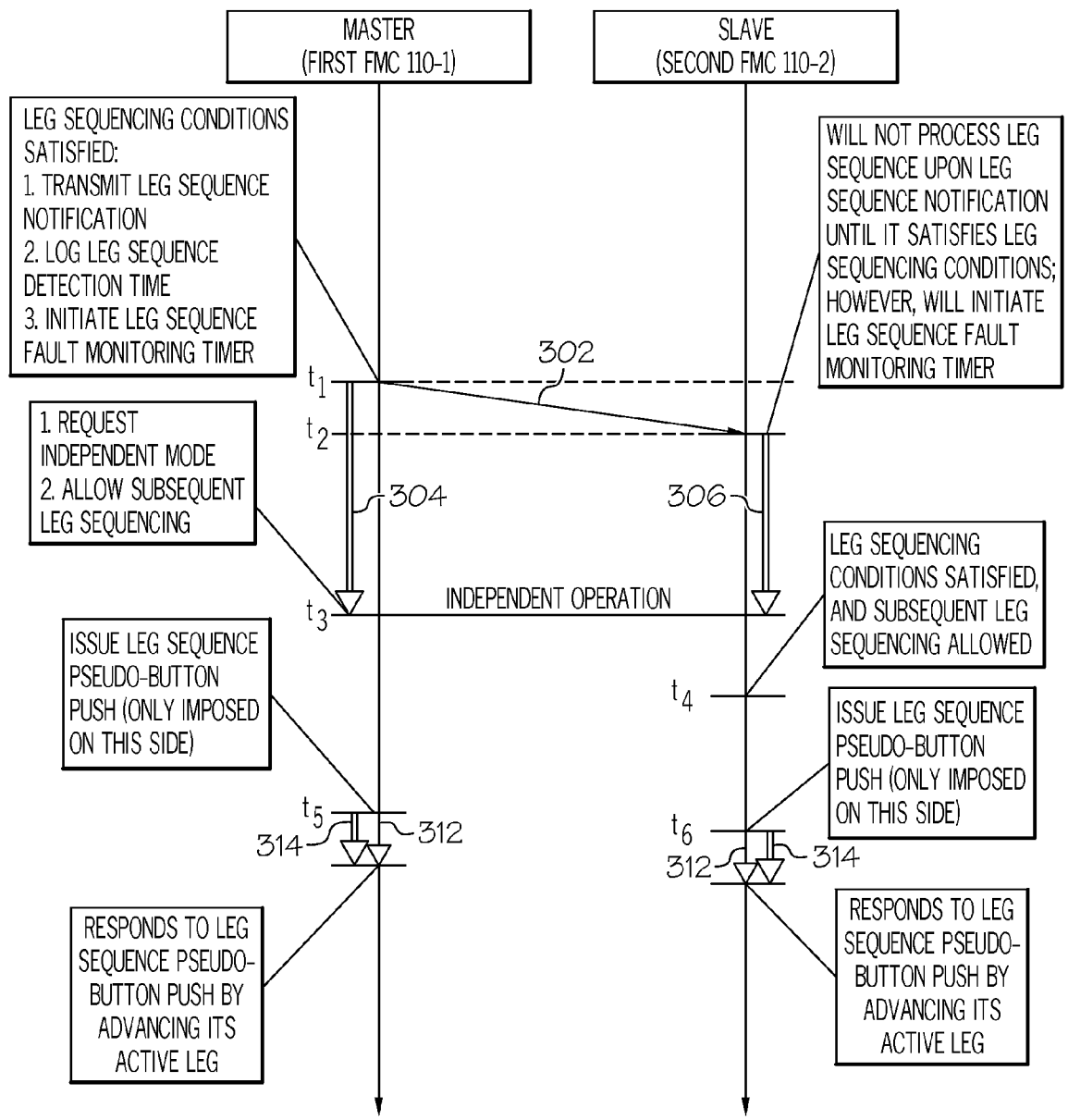
Figure 5D:
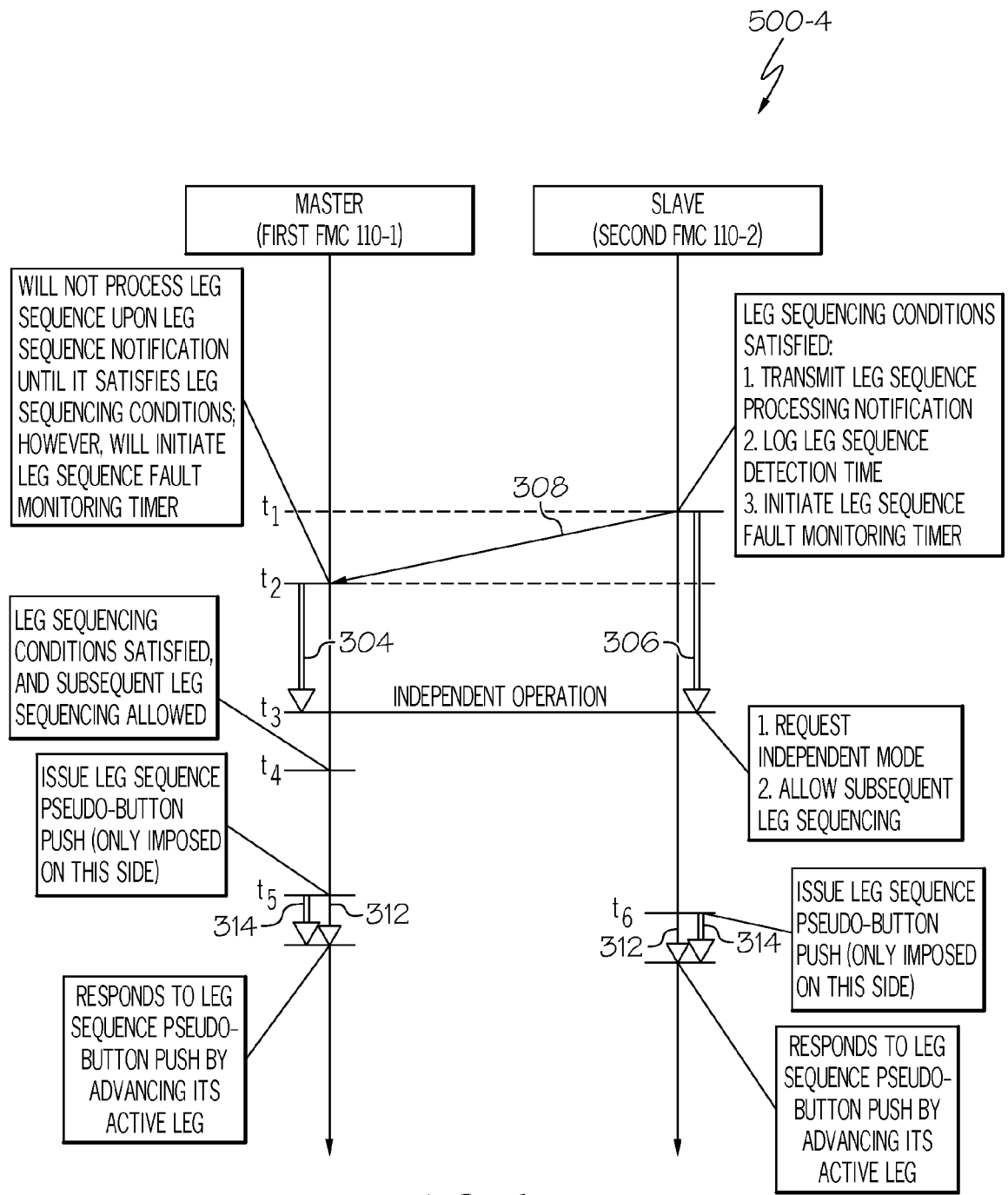

Consistent with the previous embodiments, and as FIGS. 5C and 5D depict, if any FMC 110 detects that the predetermined period of time has elapsed since it processed a lateral leg sequence without notification that one of the other FMCs has performed the same lateral leg sequence (204), it initiates an action (208), such as a request to operate in independent mode. In addition, if any FMC 110 receives a notification that active leg sequence conditions have been satisfied on a different FMC 110 and the predetermined period of time elapses without conditions being satisfied for the active leg sequence (204), it also initiates an action (208), such as a request to operate in independent mode.

With the embodiment depicted in FIGS. 5A-5D, the active lateral leg for the guidance and display functions will be synchronized (updated simultaneously) unless or until the FMCs 110 are operating in independent mode. Additionally, leg sequencing is inhibited until at least two FMCs 110 have detected lateral leg sequence conditions for the same active leg, and then the leg sequence occurs as the leg sequence pseudo-button push is processed.

In addition to implementing fault tolerant lateral waypoint sequencing, the FMS 100 described herein may also, at least in some embodiments, implement improved lateral path control data processing. In particular, in the context of the embodiment depicted in FIGS. 3A-3D, the improved lateral path control data processing is associated with the scenario in which the second (or "slave") FMC 110-2 has flown on to a "new" active leg, but cannot set the "new" leg as its active leg until the first (or "master") FMC 110-1 satisfies conditions to sequence that leg as well. In the context of the embodiment depicted in FIGS. 5A-5D, the improved lateral path control data processing is associated with the scenario in which either FMC 110-1 or 110-2 has flown on to a "new" active leg, but cannot set the "new" leg as its active leg until the other FMC 110-2 or 110-1 satisfies conditions to sequence that leg as well.

Figure 6:
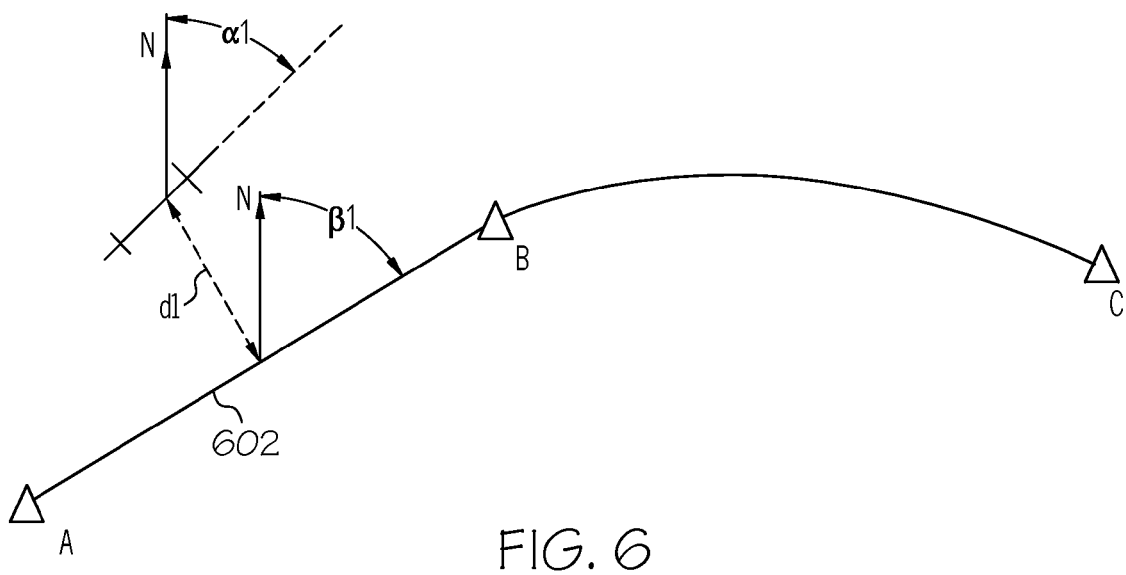
FIGS. 6 and 7 depict representations of cross track error and track angle error for straight lateral paths and curved lateral paths, respectively.
Figure 7:
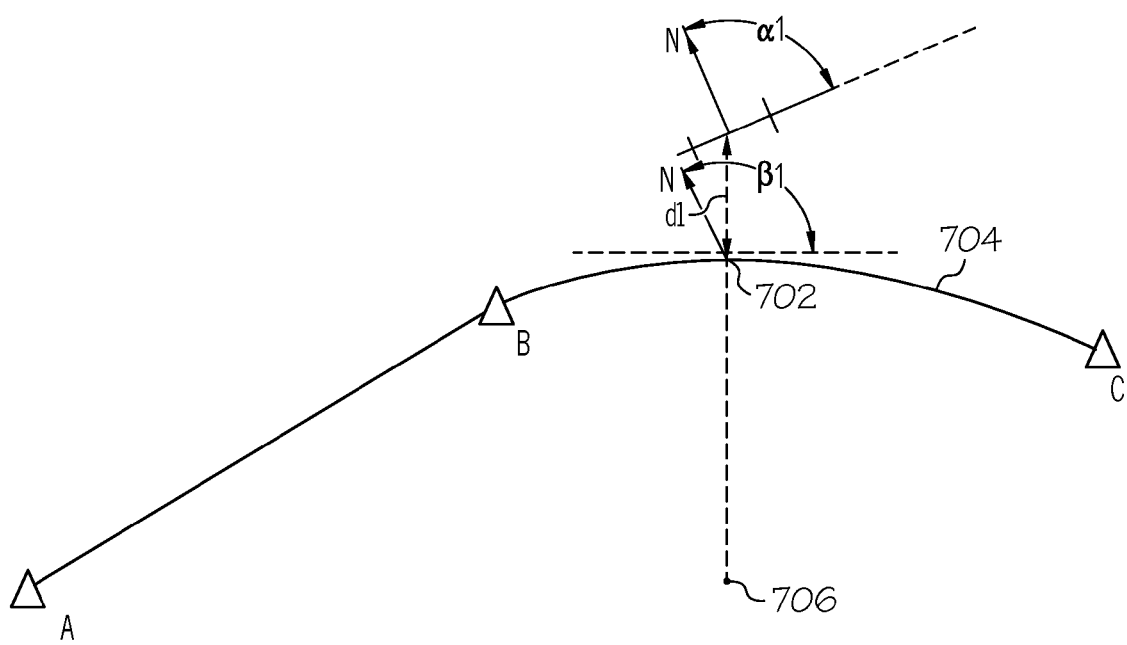

Before proceeding further, it is noted that lateral path control data includes cross track error (xtk) and track angle error (tke). As is generally known, cross track error is the distance in the lateral axis (relative to aircraft orientation) between aircraft present position and where it needs to be on a lateral path, and track angle error is the difference between aircraft present track and the track (direction) in which it is supposed to be flying. Tracks can be viewed as bearings (relative to either True or Magnetic North). These data are depicted more clearly in FIGS. 6 and 7 for straight lateral paths and curved lateral paths, respectively. In particular, as FIG. 6 depicts, for straight lateral paths, cross track error is the perpendicular distance (d1) in the lateral axis between the aircraft present position and a tangential point on the active leg lateral path 602, and track angle error is the difference between a first angle ($\alpha 1$) and a second angle ($\beta 1$). The first angle ($\alpha 1$) is the aircraft's present track (or bearing of the aircraft present path relative to North), and the second angle ($\beta 1$) is the track of a tangential point on the active leg (or bearing of the path along the tangential point on the active leg relative to North). As FIG. 7 depicts, for curved paths, cross track error and track angle error are computed relative to a point 702 that is tangent to the curved path 704, along the center 706 of the curved path 704.

Figure 8:
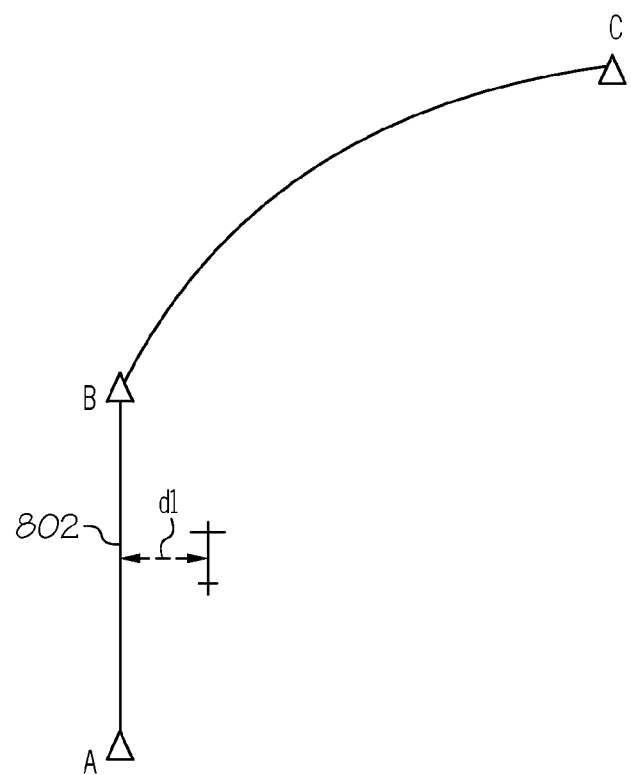
FIG. 8 depicts a simplified representation of a portion of a flight plan in which a flight management computer is flying a lateral leg between two waypoints.
Figure 9:
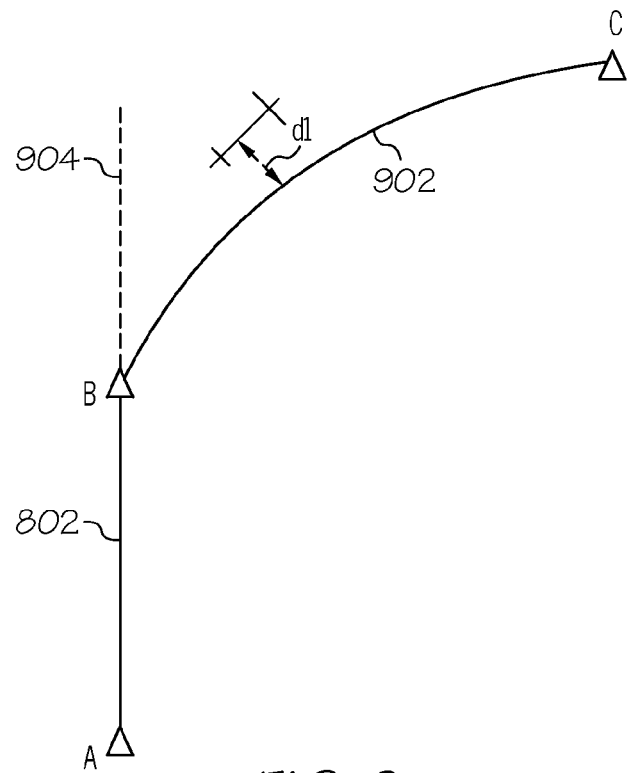
FIG. 9 depicts the simplified representation of the portion of a flight plan depicted in FIG. 8, and when the flight management computer has flown onto a "new" active leg.

With the above background in mind, the improved lateral path control data processing that may be implemented in the FMS 100 will now be described. Referring first to FIG. 8, a simplified representation of a portion of a flight plan is depicted, and the FMC 110 is flying the leg 802 between waypoints A and B, where waypoint B is the active waypoint. The FMC 110 has not yet met conditions to sequence the active leg. Thus, conventional lateral path control data processing is implemented. That is, the lateral path control data (xtk and tke) are computed relative to leg 802 while the aircraft flies to waypoint B. However, the simplified flight plan depicted in FIG. 9 represents the scenario in which one of the FMCs 110 has flown onto the "new" active leg 902 into waypoint C. In other words, this FMC 110 has satisfied conditions to sequence waypoint B. However, the other FMC 110 has not satisfied conditions to sequence waypoint B, so the depicted FMC 110 is waiting for the other FMC 110 to satisfy conditions to sequence waypoint B. If conventional lateral path control data processing were implemented, the lateral path control data (xtk and tke) would be computed relative to the leg 802 that the FMC 110 flew off of but still considers the active leg. This would result in misleading lateral path control data and guidance, as depicted via the dotted line 904. However, with the improved lateral path control data processing, the cross track error and track angle error (not depicted in FIG. 9) are computed relative to the "new" active leg 902.

The scenarios described above and depicted in FIGS. 8 and 9 are associated with static (either straight or curved) path legs. For dynamic path legs, such as an FA leg, if one of the FMCs 110 (e.g., the first FMC 110-1) has reached the specified terminating altitude associated with the FA leg and is waiting for the other FMC 110 (e.g., 110-2) to reach the terminating altitude, then the first FMC 110-1, implementing the improved lateral path control data processing, will keep re-computing the FA leg and compute the lateral path control data relative to the recomputed/updated FA leg, to generate accurate lateral path control data and guidance.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While exemplary embodiments have been presented in the foregoing detailed description of the invention, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of providing fault-tolerant lateral waypoint sequencing in a system comprising at least a first flight management computer and a second flight management computer, the method comprising the steps of:
   implementing, in the first flight management computer, a processing operation associated with lateral leg sequencing of an aircraft flight plan;
   implementing, in the second flight management computer, the processing operation associated with lateral leg sequencing of an aircraft flight plan;
   determining, in the first flight management computer, if the first flight management computer has received, within a predetermined period of time from when the first flight management computer implemented the processing operation, a notification from the second flight management computer that the second flight management computer has also implemented the processing operation; and
   initiating an action, in the first flight management computer, when the first flight management computer has not received the notification from the second flight management computer within the predetermined period of time,
   wherein the second flight management computer implements the processing operation associated with lateral leg sequencing of an aircraft flight plan without first receiving a request from the first flight management computer to implement the processing operation.

2. The method of claim 1, wherein the step of initiating an action comprises generating a request that causes the first and second flight management computers to operate in independent mode.

3. The method of claim 1, further comprising:
   initiating a timer, in the first flight management computer, upon implementing the processing operation.

4. The method of claim 1, wherein the processing operation comprises at least determining that leg sequencing conditions have been met to process a lateral leg sequence of the aircraft flight plan.

5. The method of claim 4, wherein the processing operation further comprises processing the lateral leg sequence of the aircraft flight plan, and wherein the method further comprises:
   transmitting the notification from the second flight management computer to the first flight management computer when the second flight management computer has processed the lateral leg sequence.

6. The method of claim 5, wherein the notification transmitted from the second flight management computer is a second notification, and wherein the method further comprises:
   transmitting a first notification from the first flight management computer to the second flight management computer when the first flight management computer has processed the lateral leg sequence.

7. The method of claim 4, further comprising:
   processing the lateral leg sequence of the aircraft flight plan in the second flight management computer upon receipt of the first notification.

8. The method of claim 1, wherein the processing operation comprises processing the lateral leg sequence of the aircraft flight plan.

9. The method of claim 8, further comprising:
initiating a first timer, in the first flight management computer, when the first flight management computer implements the processing operation; and
initiating a second timer, in the second flight management computer, when the second flight management computer implements the processing operation.

10. The method of claim 1, further comprising:
determining that the first and second flight management computers have both implemented the processing operation within the predetermined period of time; and
issuing a lateral leg sequence event from the first flight management computer that causes the first and second flight management computers to simultaneously sequence an active lateral leg.

11. The method of claim 1, further comprising:
computing, in the first flight management computer, cross track error and track angle error relative to a new flight plan leg associated with the lateral leg sequencing.

12. A flight management system that provides fault-tolerant lateral waypoint sequencing, comprising:
a first flight management computer configured to implement a processing operation associated with lateral leg sequencing of an aircraft flight plan; and
a second flight management computer in communication with the first flight management computer, the second flight management computer configured to also implement the processing operation and, upon implementing the processing operation, to transmit a notification to the first flight management computer,
wherein:
the first flight management computer is further configured to initiate an action when the first flight management computer has not received the notification from the second flight management computer within a predetermined period of time from when the first flight management computer implemented the processing operation, and
the second flight management computer implements the processing operation associated with lateral leg sequencing of an aircraft flight plan without first receiving a request from the first flight management computer to implement the processing operation.

13. The system of claim 12, wherein the action that is initiated comprises generating a request to operate the first and second flight management computers in independent mode.

14. The system of claim 12, wherein the first flight management computer is further configured to initiate a timer upon implementing the processing operation.

15. The system of claim 12, wherein the processing operation comprises at least determining that leg sequencing conditions have been met to process a lateral leg sequence of the aircraft flight plan.

16. The system of claim 15, wherein:
the processing operation further comprises processing the lateral leg sequence of the aircraft flight plan; and
the second flight management computer is further configured to transmit the notification to the first flight management computer when the second flight management computer has processed the lateral leg sequence.

17. The system of claim 16, wherein:
the notification transmitted from the second flight management computer is a second notification; and
the first flight management computer is further configured to transmit a first notification to the second flight management computer when the first flight management computer has processed the lateral leg sequence.

18. The system of claim 15, wherein the second flight management computer is further configured to process the lateral leg sequence of the aircraft flight plan upon receipt of the first notification.

19. The system of claim 12, wherein the processing operation comprises processing the lateral leg sequence of the aircraft flight plan.

20. The system of claim 19, wherein:
the first flight management computer is further configured to initiate a first timer when the first flight management computer implements the processing operation; and
the second flight management computer is further configured to initiate a second timer when the second flight management computer implements the processing operation.

21. The system of claim 12, wherein:
the first and second flight management computers are further configured to determine that the first and second flight management computers have both implemented the processing operation within the predetermined period of time; and
the first flight management computer is further configured to issue a lateral leg sequence event that causes the first and second flight management computers to simultaneously sequence an active lateral leg.

22. The system of claim 12, wherein the first flight management computer is further configured to compute cross track error and track angle error relative to a new flight plan leg associated with the lateral leg sequencing.

* * * * *